United States Patent
Kim et al.

(10) Patent No.: US 11,968,485 B2
(45) Date of Patent: Apr. 23, 2024

(54) SYSTEM AND METHOD FOR MONITORING MOBILE ASSET BY USING SENSING TERMINAL

(71) Applicant: C&TECH CO., LTD., Daejeon (KR)

(72) Inventors: Ki Duk Kim, Daejeon (KR); Seung Hyun Park, Sejong-si (KR); Jeong Ho Lee, Daejeon (KR)

(73) Assignee: C&TECHCO., LTD., Daejeon (KR)

( * ) Notice: Subject to any disclaimer, the term of this patent is extended or adjusted under 35 U.S.C. 154(b) by 348 days.

(21) Appl. No.: 17/625,734

(22) PCT Filed: Nov. 28, 2019

(86) PCT No.: PCT/KR2019/016523
§ 371 (c)(1),
(2) Date: Jan. 8, 2022

(87) PCT Pub. No.: WO2021/006432
PCT Pub. Date: Jan. 14, 2021

(65) Prior Publication Data
US 2022/0286760 A1    Sep. 8, 2022

(30) Foreign Application Priority Data

Jul. 9, 2019 (KR) .................. 10-2019-0082668
Oct. 14, 2019 (KR) .................. 10-2019-0127139

(51) Int. Cl.
*H04Q 9/02*    (2006.01)
*G01V 8/10*    (2006.01)

(52) U.S. Cl.
CPC .............. *H04Q 9/02* (2013.01); *G01V 8/10* (2013.01); *H04Q 2209/82* (2013.01)

(58) Field of Classification Search
CPC .............. H04Q 9/02; H04Q 2209/82; H04Q 2209/823; H04Q 9/00; G01V 8/10; Y02P 90/02; Y02P 90/30; H04W 4/02; H04W 4/38; G05B 19/418; G06Q 50/04; G06Q 50/10
See application file for complete search history.

(56) References Cited

U.S. PATENT DOCUMENTS

| | | | |
|---|---|---|---|
| 10,926,284 B1* | 2/2021 | Khaled | B05B 12/122 |
| 2005/0068194 A1* | 3/2005 | Schleich | H04Q 9/00 340/870.02 |
| 2013/0012220 A1* | 1/2013 | Waris | H04L 67/59 455/450 |

(Continued)

FOREIGN PATENT DOCUMENTS

| | | | | |
|---|---|---|---|---|
| KR | 20160136140 A | * | 5/2015 | ............. G01S 19/01 |
| KR | 1020170112463 A | * | 3/2016 | ............. G05B 23/02 |

(Continued)

*Primary Examiner* — Amine Benlagsir
(74) *Attorney, Agent, or Firm* — INVENSTONE PATENT, LLC

(57) ABSTRACT

The present specification discloses a method for monitoring a mobile asset by using a sensing terminal which comprises: a coupling unit for coupling an object of interest to the housing; a sensor unit for generating sensing data for the object of interest; a processor for generating, on the basis of the sensing data, transmission unit data to be transmitted to a server; and a communication unit for transmitting the transmission unit data to the server.

10 Claims, 6 Drawing Sheets

(56) References Cited

U.S. PATENT DOCUMENTS

| | | | | |
|---|---|---|---|---|
| 2013/0064176 A1* | 3/2013 | Hsu | ........................ | H04W 4/02 |
| | | | | 370/328 |
| 2013/0314244 A1* | 11/2013 | Hershberger | .......... | G01G 17/04 |
| | | | | 340/870.02 |
| 2014/0344400 A1* | 11/2014 | Varney | .................... | H04L 41/50 |
| | | | | 709/217 |
| 2015/0178531 A1* | 6/2015 | Boerhout | ................. | H04Q 9/00 |
| | | | | 340/10.1 |
| 2016/0028605 A1* | 1/2016 | Gil | ......................... | H04W 4/38 |
| | | | | 709/224 |
| 2017/0307722 A1* | 10/2017 | Zhang | ....................... | G01S 5/12 |
| 2017/0310498 A1 | 10/2017 | Brandman et al. | | |
| 2018/0063606 A1* | 3/2018 | Hada | ........................ | H04Q 9/00 |
| 2018/0172664 A1* | 6/2018 | Love | ..................... | H04W 12/02 |
| 2021/0035054 A1* | 2/2021 | Backhaus | .......... | G06K 7/10722 |
| 2021/0263509 A1* | 8/2021 | Takazaki | ................ | G06Q 50/04 |

FOREIGN PATENT DOCUMENTS

| | | |
|---|---|---|
| KR | 10-2016-0136140 A | 11/2016 |
| KR | 10-2017-0112463 A | 10/2017 |
| KR | 10-2019-0030899 A | 3/2019 |
| WO | 2018-067377 A1 | 4/2018 |

\* cited by examiner (a)

(b)

(a)

(b)

SYSTEM AND METHOD FOR MONITORING MOBILE ASSET BY USING SENSING TERMINAL

CROSS-REFERENCE TO RELATED APPLICATIONS

This application is a national stage of International Application No. PCT/KR2019/016523, filed on Nov. 28, 2019, which claims the benefit of priority to Korean Application(s) No. 10-2019-0082668, filed on Jul. 9, 2019 and 10-2019-0127139, filed on Oct. 14, 2019 in the Korean Intellectual Property Office, the disclosures of which are incorporated herein by reference.

BACKGROUND OF THE DISCLOSURE

Field of the Disclosure

The present disclosure relates to a method for monitoring a mobile asset.

Related Art

With the development of IoT technology, the demand for remote monitoring and management of moving assets in factories or warehouses is increasing. In accordance therewith, the number of methods for generating information about a mobile asset using an IoT terminal and transmitting the same to a user terminal are disclosed.

Patent Document 1 discloses a factory monitoring system including a sensor terminal that is installed in each of one or more process equipment and conveyors to measure and analyze an operating state of each of the process equipment and conveyor, a management server that collects a result value analyzed by the sensor terminal and determines whether the operating state is abnormal based on the result value, and a display device that receives and outputs the operating state and whether the operating state is abnormal.

However, in such systems, a significant amount of data is transmitted/received between a sensor terminal and a server for monitoring the target object. Accordingly, the power consumption of a sensor terminal is increased. Due to this issue, the sensor terminal needs to use a constant power. When a battery is applied to a sensor terminal, a problem occurs that the battery needs to be frequently replaced.

SUMMARY

The present disclosure provides a method for users to effectively manage a mobile asset by providing a sensing terminal installed in an object that is a mobile asset such as a machine or facility in a factory, and thus then effectively collecting sensing data generated by operation of the object and analyzing the collected data to extract meaningful information about a state of the object and provide the information to users.

Furthermore, the present disclosure provides a method of providing a warning message according to a risk level to a user by performing risk determination according to the type of a sensing terminal attached to an object being separated from the object.

A sensing terminal according to an embodiment includes a housing, a coupling unit for coupling a target object to the housing, a sensor unit for generating sensing data for the target object, a processor for generating, based on the sensing data, transmission unit data to be transmitted to a server, and a communication unit for transmitting the transmission unit data to the server.

Advantageous Effects

The method for monitoring a mobile asset described in the present disclosure provides a sensing terminal installed in a target object that is a mobile asset such as a machine or facility in a factory, and sensing data generated by operation of the object is effectively collected, the collected data is analyzed and meaningful information about a state of the object is provided, and accordingly, a user may effectively manage a mobile asset.

Furthermore, the present disclosure provides an effect of providing a warning message according to a risk level to a user by performing risk determination according to the type of a sensing terminal attached to an object being separated from the object.

DESCRIPTION OF EXEMPLARY EMBODIMENTS

Figure 1:
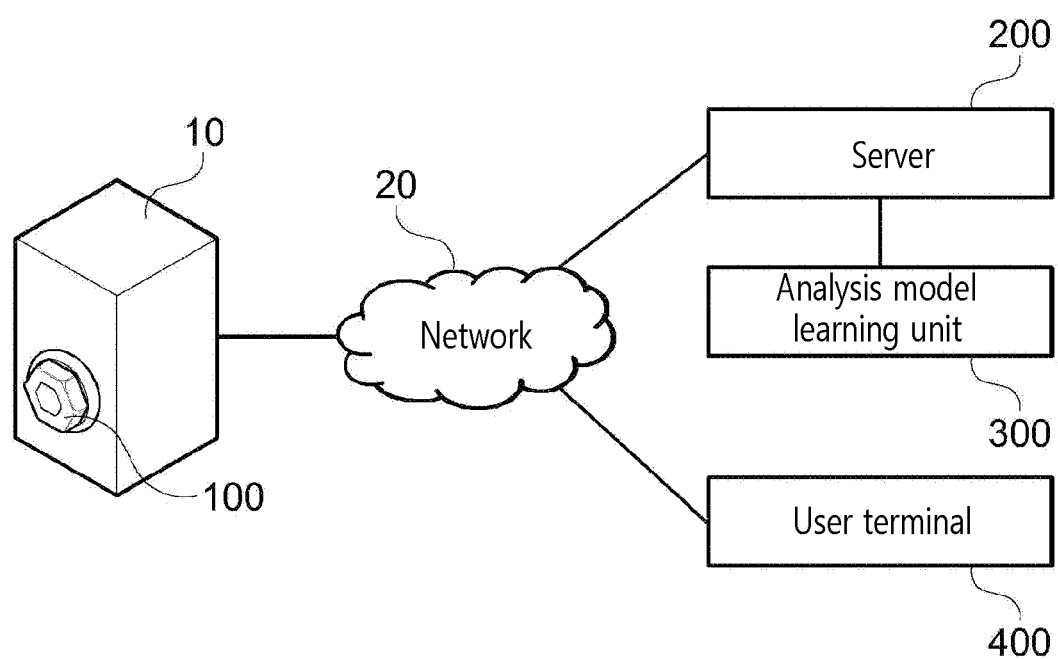
FIG. 1 is a conceptual diagram illustrating an overall configuration of a system for monitoring a mobile asset according to an embodiment.

A sensing terminal according to an embodiment includes a housing, a coupling unit for coupling a target object to the housing, a sensor unit for generating sensing data for the target object, a processor for generating, based on the sensing data, transmission unit data to be transmitted to a server, and a communication unit for transmitting the transmission unit data to the server.

The processor may generate state data of the target object having a data size smaller than a data size of the sensed data based on the sensing data, and the transmission unit data may include the state data of the target object.

The sensing terminal may further include an illuminance sensor formed on one side of the housing. The processor may determine whether the sensing terminal is detached from the target object according to a change in an illuminance value measured using the illuminance sensor, and the processor may determine a detachment type in which the sensing terminal is detached from the target object according to the change in the illuminance value measured using the illuminance sensor.

The processor may compare the illuminance value measured from the illuminance sensor according to an elapse of time with a threshold illuminance value specified according to the elapse of time when the illuminance value is measured after the sensing terminal is attached to the target object to determine the detachment type, and the processor may determine a forced detachment when the measured illuminance value is greater than the threshold illuminance value.

The sensing terminal may further include a detachable switch formed on one side of the housing. The processor may apply an illuminance measurement start signal to the illuminance sensor when receiving a detachment signal from the detachable switch, and the processor may determine whether the sensing terminal is detached from the target object according to the change in the illuminance value measured from the illuminance sensor. The illuminance sensor may not sense the illuminance before receiving the illuminance measurement start signal from the processor.

When the measured illuminance value is smaller than a preset threshold value, the illuminance sensor may not store an illuminance value in a memory. When the measured illuminance value is greater than a preset threshold value, the illuminance sensor may store an illuminance value in the memory and apply a detachment signal to the processor.

The coupling unit may further include a slit, and the illuminance sensor may sense an illuminance value by the light introduced through the slit even when the sensing terminal is attached to the target object.

In addition, a server according to an embodiment may include a communication unit for receiving transmission unit data from a sensing terminal, and a processor for acquiring sensing information of the sensing terminal from the transmission unit data. The processor may determine a state of a target object to which the sensing terminal is attached according to the sensing information.

The sensing information may include base station information for performing a communication connection with the sensing terminal, and the base station information may not be included in a safe cell which is a list of base stations to which communication is connectable when the sensing terminal is present in a normal position. The processor may add the base station information to the safe cell when the number of base stations registered in the safe cell is less than a preset number.

The sensing information may include base station information performing a communication connection with the sensing terminal, and the base station information may not be included in a safe cell which is a list of base stations to which communication is connectable when the sensing terminal is present in a normal position. The processor may determine that the sensing terminal is deviated from a normal position when the number of base stations registered in the safe cell is a preset number.

In addition, a method for monitoring a target object using a sensing terminal according to an embodiment includes generating sensing data for the target object, generating transmission unit data to be transmitted to a server based on the sensing data, and transmitting the transmission unit data to the server.

The monitoring method may further include determining whether the sensing terminal is detached from the target object according to a change in an illuminance value measured using an illuminance sensor and determining a detachment type in which the sensing terminal is detached from the target object according to the change in the illuminance value measured using the illuminance sensor.

In addition, a method for monitoring a target object performed by a server includes receiving transmission unit data from a sensing terminal, acquiring sensing information of the sensing terminal from the transmission unit data, and determining a state of a target object to which the sensing terminal is attached according to the sensing information.

The method may further include determining whether the sensing terminal is located on a normal position based on a safe cell, which is a list of base stations to which communication is connectable, and the sensing information may include base station information for performing a communication connection with the sensing terminal. The base station information may not be included in the safe cell, and when the number of base stations registered in the safe cell is smaller than a preset number, the base station information may be added to the safe cell. When the number of base stations registered in the safe cell is smaller than a preset number, the sensing terminal may be determined to be deviated from a normal position In addition, a computer readable recording medium according to an embodiment, a computer program written to perform a method for monitoring at least one target object may be recorded.

Hereinafter, the following merely illustrates the principles of the invention. Therefore, those skilled in the art will be able to devise various devices which, although not explicitly described or illustrated herein, embody the principles of the invention and fall within the concept and scope of the invention. It is also to be understood that all conditional terms and embodiments described in the present disclosure are, in principle, intended only for the purpose of enabling the inventive concept to be understood, and are not intended to limit the scope of the invention to such specifically recited embodiments and conditions.

The foregoing and other objects, features, and advantages of the invention will become more apparent from the following detailed description of the invention when taken in conjunction with the accompanying drawings. Accordingly, those skilled in the art will readily understand the technical idea of the invention from the detailed description.

The terms "first", "second", "third", "fourth", and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

In addition, the terms "left", "right", "front", "back", "top", "bottom", "over", "under", and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used.

In addition, in the specification and the claims, terms such as "connected", "connecting", "linked", "linking", "coupled", "coupling", and the like, and various modifications of these terms may be used as the meaning including that one component is directly connected to another component or is indirectly connected to another component through the other component.

In addition, terms "module" and "unit" for components used in the present specification are used only in order to easily make the specification. Therefore, these terms do not have meanings or roles that distinguish from each other in themselves.

In addition, terms used in the present disclosure are for explaining embodiments rather than limiting the present disclosure. In the present disclosure, a singular form includes a plural form unless explicitly described to the contrary. Components, steps, operations, and/or elements mentioned by terms "comprise" and/or "comprising" used in the specification do not exclude the existence or addition of one or more other components, steps, operations, and/or elements.

In addition, in the description of the present disclosure, when it is determined that a specific description of known techniques related to the present disclosure unnecessarily obscure the gist of the present disclosure, the detailed description thereof will be omitted. Hereinafter, preferred embodiments of the present disclosure will be described in detail with reference to the accompanying drawings.

Hereinafter, a method for monitoring a mobile asset according to an embodiment of the present disclosure will be described with reference to the drawings. FIG. 1 is a conceptual diagram illustrating an overall configuration of a system for monitoring a mobile asset according to an embodiment.

The system for monitoring a mobile asset includes a sensing terminal 100, a server 200, and a user terminal 400, and each element may communicate data with each other through a network 20.

The sensing terminal 100 acquires data on a state of a target object 10 that is a moving asset for monitoring and transmits the acquired data to the server 200 or the user terminal 400 through the network 20.

The sensing terminal 100 may be located on the target object 10 for data acquisition. In one embodiment, the sensing terminal 100 may acquire state data of the target object 10 by being attached to an inner or outer surface of the target object 10 and sensing the surface of the monitoring target object 10. For example, the sensing terminal 100 may be attached to an outer surface of the target object 10 to generate vibration data of the target object 10 using a built-in acceleration sensor.

In another embodiment, the sensing terminal 100 may be located adjacent to the target object 10. The sensing terminal 100 may acquire state data of the target object 10 while being spaced apart from the target object 10 by a predetermined distance. For example, the sensing terminal 100 may generate temperature data of the target object 10 at a location spaced apart from the target object 10 by a predetermined distance using a built-in thermal sensor.

Figure 2:
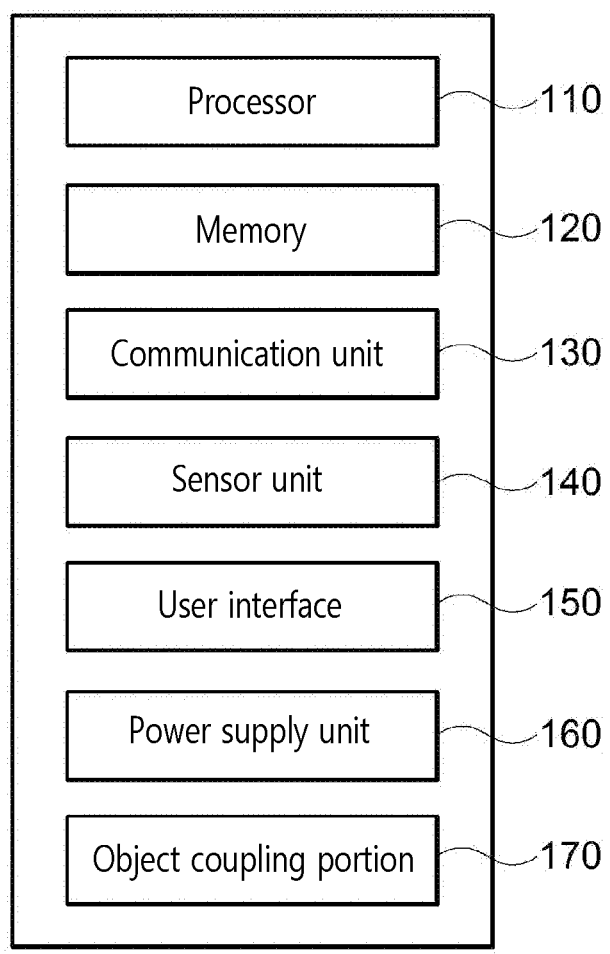
FIG. 2 is a block diagram illustrating an internal configuration of a sensing terminal 100.

The sensing terminal 100 will be described in more detail with reference to FIG. 2. FIG. 2 is a block diagram illustrating an internal configuration of the sensing terminal 100. The sensing terminal 100 may include a processor 110, a memory 120, a communication unit 130, a sensor unit 140, a user interface 150, a power supply unit 160, and an object coupling portion 170 in a housing (not shown). Some elements may be omitted, or any additional element may be further included as needed.

The processor 110 generates state data of the target object 10 by controlling each element constituting the sensing terminal 100 using a program and data stored in the memory 120 and stores the state data in the memory 120. For example, the processor 110 generates state data of the target object 10 by controlling the sensor unit 140 according to a sensing algorithm stored in the memory and stores the same in the memory 120 or transmits the generated data to the sever 200 or the user terminal 300 using the communication unit 130.

The processor 110 may generate state data of the target object having a data size smaller than a data size of the sensed data based on the sensed data in order to reduce the size of data transmitted through the communication unit 130. In addition, the processor 110 may generate transmission unit data using the same.

The memory 120 includes a program and data for operating each module of the processor 110 and the sensing terminal 100. Data generated according to an operation of the sensing terminal 100 may be stored in the memory 120.

The communication unit 130 performs wired or wireless communication with an external device so that the sensing terminal 100 may transmit and receive data to and from the server 200 or the user terminal 300. The communication unit 130 may include a USIM connector into which a USIM card containing identification information of a wireless communication line subscriber may be inserted.

The sensor unit 140 includes at least one sensor for the sensing terminal 100 to generate state information of the target object 10. Hereinafter, examples of available sensors will be described. The scope of the present disclosure is not limited by the description below.

In one embodiment, the sensor unit 140 may include an acceleration sensor or a gyro sensor to acquire vibration data and/or data on the movement of the target object 10. The sensor unit 140 may include a temperature sensor to measure a temperature of the target object 10. For example, an infrared thermometer or the like may be applied. The sensor unit 140 may include a humidity sensor to measure the humidity near the target object 10. The sensor unit 140 may include an illuminance sensor for measuring ambient illuminance of the sensing terminal 100. The sensor unit 140 may include a detachable switch for sensing whether the sensing terminal 100 is detached from the target object 10 and the sensing terminal 100 is separated from the target object 10 when the sensing terminal 100 is attached to the target object 10. In addition, the sensor unit 140 may use a GPS sensor, a gyro sensor, and/or a geomagnetic sensor to determine whether the target object 10 moves and may use an atmospheric pressure sensor and/or pressure sensor to determine atmospheric pressure or pressure. A power amount sensor may be included to sense the amount of power of the target object 10.

The user interface 150 includes a user input unit for controlling the sensing terminal 100 and an information output unit for providing information to a user. In one embodiment, the user input unit may include a button, and the information output unit may include an LED or a speaker. For example, an operation button for changing a state of a terminal or an LED for displaying an operation state may be configured on the side of the sensing terminal 100. In one embodiment, the LED may represent the remaining battery level of the sensing terminal 100 in green, yellow, and red colors, and the LED may maintain a lit state when a communication connection is not established.

The power supply unit 160 is a unit for supplying power to the sensing terminal 100 and may include external wired power or an internal or external battery.

The coupling unit 170 is a coupling unit for coupling the sensing terminal 100 to the target object 10. In one embodiment, the coupling unit 170 may be a double-sided tape having strong adhesive force or a bolt for mechanical bonding and may be a welding base material when welding is performed according to an embodiment.

Figure 3:
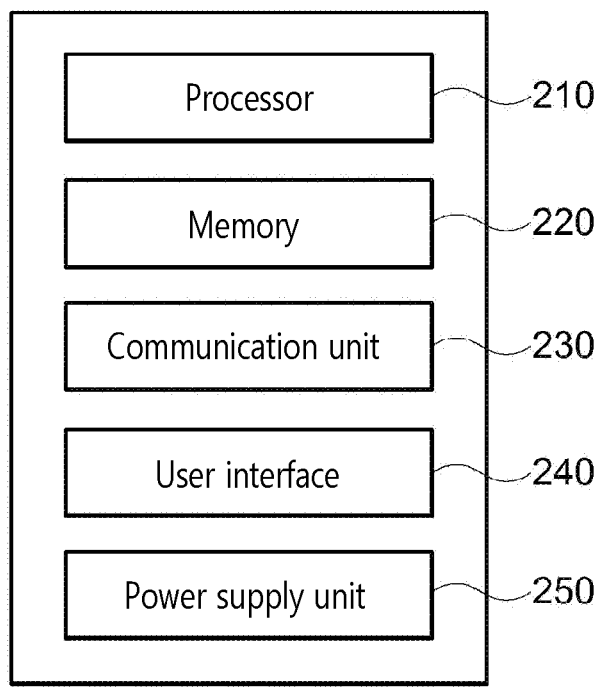
FIG. 3 is a block diagram illustrating an internal configuration of a server 200.

The server 200 will be described in more detail with reference to FIG. 3. FIG. 3 is a block diagram illustrating an internal configuration of the server 200. The server 200 may include a processor 210, a memory 220, a communication unit 230, a user interface 240, and a power supply unit 250 in a housing (not shown). Some elements may be omitted, or any additional element may be further included as needed.

The processor 210 operates the server 200 by controlling the components of the server 200 such as the memory 220, the communication unit 230, and the power supply unit 250 to perform a method for monitoring a mobile assent according to an embodiment of the present disclosure.

The memory 220 may store a program necessary for operation of the processor 210, the sensing data received from the sensing terminal 100 and the analysis result data extracted by operation of the processor 210.

The communication unit 230 may transmit and receive data by performing data communication with an external terminal such as the sensing terminal 100, an analysis model learning unit 300, and the user terminal 400 under the control of the processor 210. For example, the communication unit 230 may receive data such as sensing data and a warning notification from the sensing terminal 100 and transmit data for learning to the analysis model learning unit 300 and receive an analysis model. In addition, the communication unit 230 may transmit mobile asset monitoring information according to a data analysis result generated as sensing data to the user terminal 400.

Hereinafter, the operation of the server 200 will be described. The server 200 compares the newly updated sensing data as received from the sensing terminal 100 with the existing data histories stored in the memory, and thus, it may be checked whether a state indicating a data value different from the existing one occurs in the target object 10 to which the sensing terminal 100 is attached. The sensing data received by the server 200 from the sensing terminal 100 may include a generation time of the sensing data, information of the sensing terminal 100 generating the sensing data, a type of sensing data, and a value of the sensing data.

In one embodiment, the server 200 checks whether the value of the sensing data received from the sensing terminal 100 is within an effective variation range according to the existing data value stored in the memory, and thus, the sensing terminal 100 may determine that an abnormal state has occurred in the attached target object. In one embodiment, the effective variation range calculated according to the existing data value is a range of data values determined by an upper limit value and a lower limit value of the existing data or may be set in a range of a data value determined according to a preset error rate based on an intermediate value between the upper limit value and the lower limit value.

In addition, in one embodiment, the server 200 patterns the change history of the existing data and checks whether the data updated from the sensing terminal 100 has continuity with the change pattern of the existing data, thereby setting an effective variation range. In one embodiment, the server 200 may generate a change pattern that periodically increases or decreases according to the change history of the existing data value. In this case, the effective variation range may be set as a range specified by an upper limit value and a lower limit value according to a variation pattern of the existing data. Alternatively, according to the interval variation pattern of the existing data, the effective variation range may be set as a data value range according to a preset error rate based on the predicted value predicted according to the current period.

In the case that the updated sensing data from the sensing terminal 100 is within the effective variation range in relation to the existing data values stored in the memory, the updated sensing may be stored in the memory as normal operation data. Furthermore, the server 200 may update the effective variation range by reflecting the updated sensing data.

In the case that the updated sensing data from the sensing terminal 100 deviates from the effective variation range of the existing data value stored in the memory, the server 200 may store the updated sensing data in the memory as abnormal operation data. Further, the server 200 may transmit a notification message to the user terminal 400.

The server 200 may use a machine learning model to check state information of the target object 10 to which the sensing terminal 100 is attached by utilizing the sensing data received from the sensing terminal 100 more accurately. For this, the server 200 may transmit the sensing data to the analysis model learning unit 300. After learning of an analysis model is completed in the analysis model learning unit 300, the server 200 may receive the analysis model from the analysis model learning unit 300 and analyze the sensing data with the received analysis model, and thus, analyze the state information of the target object 10 in more detail.

In addition, the server 200 may generate various types of monitoring information according to configuration data received from the user terminal 400. For example, the server 200 may receive sensing data of the target object 10 stored in the memory 120 of the sensing terminal 100 in every predetermined period. For example, according to a configuration of a user, the server may receive the sensing data by once for 24 hours and store the sensing data in the memory 220 of the server 220.

Furthermore, when a value of the sensing data deviates from a predetermined effective variation range, when the sensing terminal 100 is in short battery remains, when a GPS value of the sensing terminal 100 deviates from a normal position range preset by a user, and when a power amount sensing value obtained from a power amount sensing module of the target object 10 of the sensing terminal 100 deviates from a power range preset by a user, the server 200 may store the corresponding event in the memory and transmit a notification to the user terminal 400.

In addition, the server 200 may configure a type of industry on the industrial classification to calculate a rate of operation of the target object according to the configuration data received from the user terminal 400 and analyze whether the rate of operation increases or decreases compared to last day or last month, or last year by calculating the rate of operation of the moving assets corresponding to the configured type of industry, and thus, generate information of investment by which whether investment is proper in the financial sector.

The industrial classification may be industrial classification information classified by a public institution according to industry. For example, the industrial classification may be information of classifying a type of industry such as industry of manufacturing electronic components. The rate of operation is an index that represents a degree of usage of manufacturing facility and represents a ratio of actual production in comparison with maximum production which is producible when a company operates the manufacturing facility in a normal operation under a given condition (facility, labor, production efficiency, etc.). Although there is a difference depending on the production facility of individual company, the condition in which the rate of operation is 80% or more means a normal operation state, commonly. Accordingly, when the rate of operation of a current specific field is calculated, the growth rate of the corresponding industry field may be anticipated.

When the rate of operation increases compared to last day or last month, the server 200 may determine that the corresponding field is growing, and when the rate of operation decreases, the server 200 may determine that the corresponding field is in stagnation period or decline period.

In order to process information as such, the memory 220 of the server 200 may store at least one type of information including location and identification information of the target object 10, history information of the target object 10, industry classification information of an owner of the target object 10, size and number of workers information of an owner of mobile assets, sales information, character information of an owner of the target object 10, financial statements information, authentication information of an owner of the target object 10, and company foundation information of an owner of the target object 10. Through this, a financial institution may generate a reference index for determining whether the field is proper for investment by utilizing the data.

The server 200 may extract sensing data of the target object 10 corresponding to a configured industry or location or extract operating state information of the target object 10. For example, the server 200 may extract company information of electronic components in Daejeon and generate the same from the sensing terminal 100 of the target object 10 owned by the corresponding company, and thus, extract sensing data or state information of the target object 10 generated therefrom. The server 200 may refer to the sensing data of the extracted from the target object 10 and calculate the rate of operation per industry or location.

For example, in the case that the target object 10 is a conveyer belt, the server 200 may acquire operation data thereof. For example, in the case that the conveyer belt operates for 20 hours for 24 hours which correspond to an interest of calculation for the rate of operation, the rate of operation may be calculated as 83.3%. In such a method, the server 200 may calculate the rate of operation per industry corresponding to the electronic component field.

Hereinafter, an embodiment of configuring a method for monitoring a mobile asset according to an embodiment of the present disclosure will be described in detail.

In order for the sensing terminal 100 to monitor a state of the target object 10 continuously and guarantee reliability for which the monitored data corresponds to data for the target object 10, the sensing terminal 100 may be required to check whether the sensing terminal 100 is attached to the target object 10. The sensing terminal 100 may monitor whether the sensing terminal 100 is attached to the target object 10 and determine whether the sensing terminal 100 is attached/detached. Here, the attachment means the state in which the sensing terminal 100 is attached to the target object 10, and the detachment means the state in which the sensing terminal 100 is detached from the target object 10.

Figure 4:
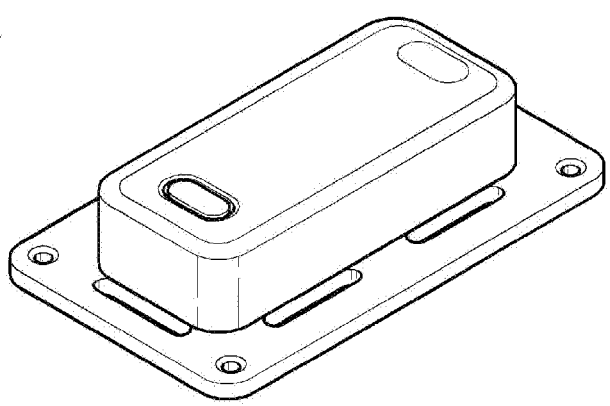
FIG. 4 is a diagram illustrating a shape of the sensing terminal 100 according to an embodiment.
Figure 4:
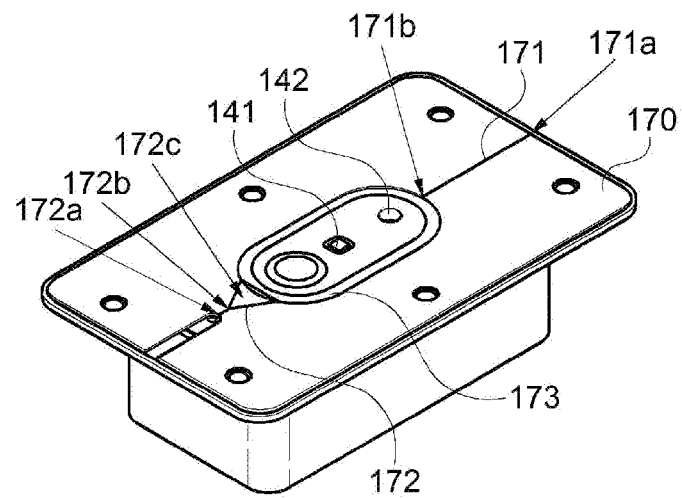

FIG. 4 is a diagram illustrating a shape of the sensing terminal 100 according to an embodiment. FIG. 4(*a*) shows an outer surface on which the user interface 150 of the sensing terminal 100 is installed, and FIG. 4(*b*) shows an attachment surface on which a double-sided tape is implemented as the object coupling portion 170 for attaching the sensing terminal 100 to the target object 10.

In one embodiment, the sensing terminal 100 may determine whether the sensing terminal 100 is attached by an operation of a detachable switch 141 located on the attachment surface of the sensing terminal 100. When the sensing terminal 100 is attached to an object, the detachable switch 141 may maintain a pressed state since the attached surface of the object presses the detachable switch 141, and when the sensing terminal 100 is detached from the target object 10, the detachable switch 141 may maintain a released state since the force of pressing the detachable switch 141 by the attached surface of the object is released. To exhibit such a result, the detachable switch 141 may have a form protruding from the attached surface such as a double-sided tape in comparison with other components on the attached surface of the sensing terminal 100.

In the case of using the detachable switch 141, the sensing terminal 100 in a sleep mode is waken up and transmits whether the sensing terminal 100 is detached from an external device when the detachable switch 141 is released. The sensing terminal 100 maintains in a sleep mode until the detachable switch 141 is released, and there is an effect that the power consumption of the sensing terminal 100 to sense whether the sensing terminal 100 is detached may be reduced. For example, in the case that the detachable switch 141 is in pressed state, a circuit may be in an open state, and in the case that the detachable switch 141 is in released state, a circuit may be in a conducting state. In the conducting state, the sensing terminal 100 in a sleep mode may be waken up.

In another embodiment, the sensing terminal 100 may determine whether the sensing terminal 100 is attached by an operation of an illuminance sensor 142. As shown in the example of FIG. 4, the illuminance sensor 142 may be located on or near to the attached surface of the sensing terminal 100. Accordingly, the sensing terminal 100 may detect a lower illumination value in the case that the sensing terminal 100 is attached to the target object 10 than in the case that the sensing terminal 100 is detached from the target object 10. Therefore, the sensing terminal 100 may determine that the sensing terminal 100 is detached from the target object 10 when an illumination value increases.

When the illuminance value increases over a detachment threshold value that represents a detachment state, the sensing terminal 100 may determine that the sensing terminal 100 is detached from the target object 10. In order to reduce power consumption, the sensing terminal 100 may perform sensing of an illuminance only in the case that the illuminance value is smaller than the detachment threshold value and may not store the sensed illuminance value in the memory 120. When the illuminance value is greater than the detachment threshold value, the sensing terminal 100 may determine that the sensing terminal 100 is detached from the target object 10, store the sensed illuminance value in the memory 120, changes the state of the sensing terminal from a sleep mode to a wakeup mode, and transmit a message informing that the sensing terminal 100 is detached from the target object 10. In such as case, since operation of memory access is performed only when the illuminance value greater than the detachment threshold value is measured, there is an effect that the power consumption of the sensing terminal 100 to sense whether the sensing terminal 100 is detached may be reduced.

Meanwhile, in the case of using the illuminance sensor 142, an illumination value may not be measured in the case that the illuminance sensor 142 is defective, and there is a problem the sensing terminal 100 may not determine whether the sensing terminal 100 is detached. For this, in order to determine a normal operation of the illuminance sensor 142, a predetermined amount of light may incident on the illuminance sensor 142 even in the case that the sensing terminal 100 is attached.

In one embodiment, a slit 171 or 172 through which a small amount of light may be incident may be formed on an attachment surface of the sensing terminal 100. The slit 171 may be formed on a part of the object coupling portion 170. As illustrated in FIG. 4, the slit 171 may be formed in a shape in which a part of the object coupling portion 170 is grooved and formed extendedly into an inner side 171b from an outer side 171a of the object coupling portion 170 such that external light is incident along the groove and reaches the illuminance sensor 142. A small amount of light may be incident to the illuminance sensor 142 through the slit 171, and the illuminance sensor 142 may sense a varying illumination value even when the sensing terminal 100 is attached, and accordingly, set the varying illumination value in the attached state as an illumination value in a normal range. In order to set the illumination value in a normal range, the sensing terminal 100 may measure a varying range of the illumination values during a predetermined period and set the illumination value in a normal range according to the varying range of the illumination value. For example, the sensing terminal 100 may store the highest value among the illumination values measured during a predetermined period after attachment as the illumination value in a normal range in the memory 120.

Accordingly, the sensing terminal 100 may detect an operation error of the illuminance sensor 142 when an illumination value of the illuminance sensor 142 is 0 and determine that the illuminance sensor 142 is in a normal operation when an illumination value of the illuminance sensor 142 is greater than 0 and the illumination value in a normal range. The sensing terminal 100 may sense an illumination value only in the case that the illuminance value is smaller than the detachment threshold value and may determine that the sensing terminal 100 is detached from the target object 10 in the case that the illuminance value is greater than the detachment threshold value.

Figure 5:
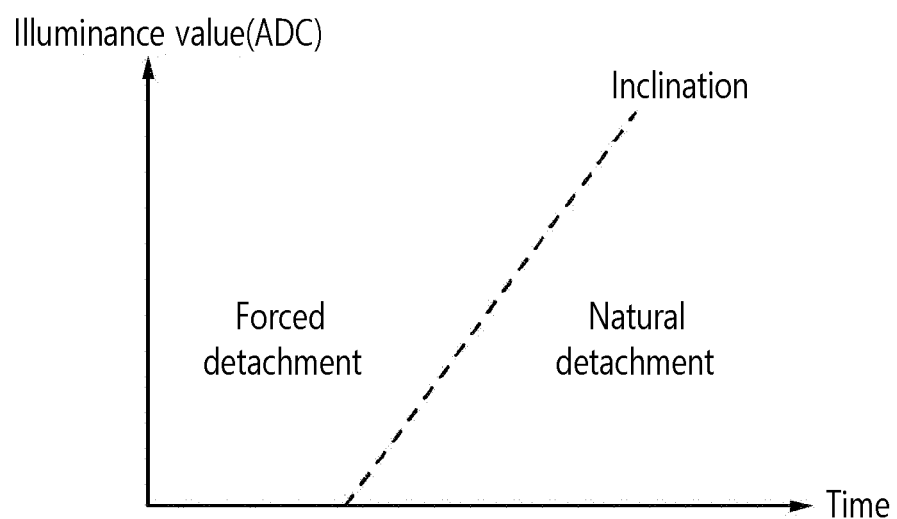
FIGS. 5 and 6 are diagrams illustrating a pattern of illumination values measured from the illuminance sensor 142 of the sensing terminal 100.
Figure 6:
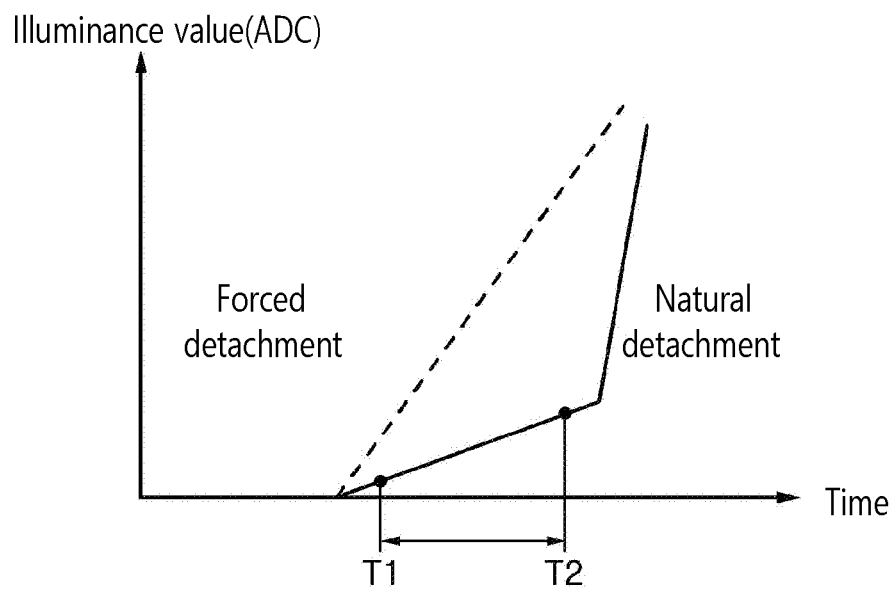
Figure 6:
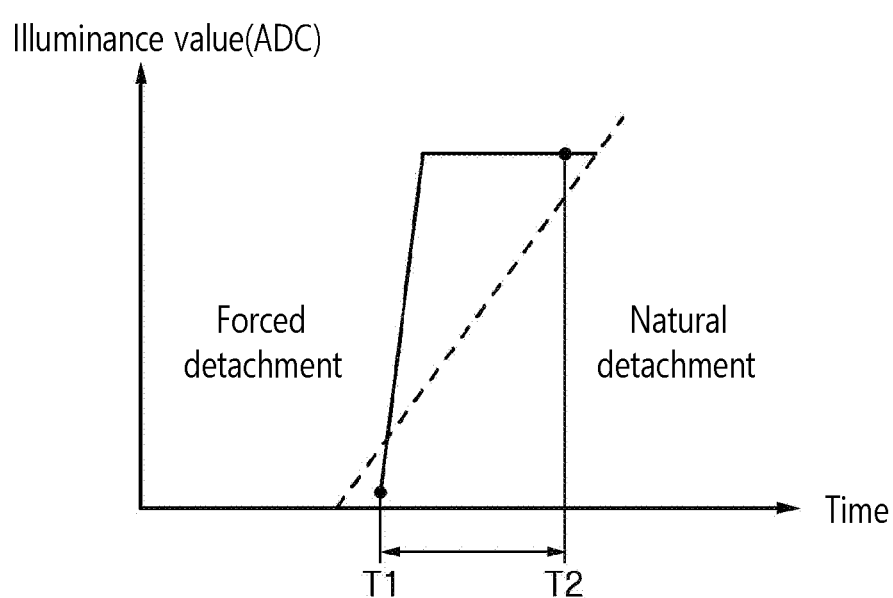

FIGS. 5 and 6 are diagrams illustrating a pattern of illumination values measured from the illuminance sensor 142 of the sensing terminal 100. FIG. 5 shows a reference pattern for distinguishing a forced detachment and a natural detachment. The reference pattern represents a change in the illuminance value according to an elapse of time after the sensing terminal 100 is attached to the target object 10. The sensing terminal 100 may compare the illuminance value with a threshold illuminance value specified according to the elapse of time and the reference pattern after the sensing terminal 100 is attached to the target object 10 to determine a detachment type. The sensing terminal 100 may determine a forced detachment when the measured illuminance value shows a value of a forced detachment that represents a value greater than the threshold illuminance value and determine a natural detachment when the measured illuminance value shows a value of a forced detachment that represents a value equal to or greater than the threshold illuminance value.

In one embodiment, in the case of the natural detachment that the sensing terminal 100 is naturally detached from the target object 10 since an adhesive force of the object coupling portion 170 decreases as an elapse of time, the illumination value of the illuminance sensor 142 slowly increases in comparison with the reference pattern. Accordingly, as illustrated in FIG. 6(a), the illumination value graph is depicted in a natural detachment region.

However, in the case of the forced detachment that the sensing terminal 100 is detached from the target object 10 owing to an external force exerted on the sensing terminal 100 in addition to decrease of the adhesive force, the illumination value of the illuminance sensor 142 abruptly increases in comparison with the reference pattern. Accordingly, as illustrated in FIG. 6(b), the illumination value graph is depicted in a forced detachment region.

In another embodiment, the slit may formed in two or more portions of the attachment surface. The widths of the slit formed on the attachment surface are differently provided, and the natural detachment and the forced detachment may be distinguished. For example, a first slit 171 and a second slit 172 may be formed on the object coupling portion 170 as shown in FIG. 4. The first slit 171 may be located on an upper part based on the direction along which the sensing terminal 100 is detached from the target object 10, and the second slit 172 may be located on a lower part based on the direction along which the sensing terminal 100 is detached from the target object 10. A width of the second slit 172 may be changed as shown in FIG. 4. The second slit 172 may be formed with a uniform width from an outer portion 172a to a middle portion 172b but may be formed with a width that uniformly increases from the middle portion 172b to an inner portion 171c.

In the case that detachment between the sensing terminal 100 and the target object 10 occurs from a left end portion or a right end portion of the sensing terminal 100 based on FIG. 4(b), a change of light amount incident on the illuminance sensor 142 through the slits 171 and 172 does not occur until an inner boundary 173 of the object coupling portion 170 is separated. Accordingly, in the case that a separation occurs from a left side or a right side of the sensing terminal 100, according to the separation of the inner boundary 173 of the object coupling portion 170, the illumination value measured by the illuminance sensor 142 abruptly increases and then maintains.

In the case that detachment between the sensing terminal 100 and the target object 10 occurs from an upper portion of the sensing terminal 100 based on FIG. 4(b), as the separation progresses, the light path of the light incident through the first slit 171 becomes short, and accordingly, the light amount incident on the illuminance sensor 142 increases. Lastly, according to the separation of the inner boundary 173 of the object coupling portion 170, the illumination value measured by the illuminance sensor 142 abruptly increases and then maintains.

In the case that detachment between the sensing terminal 100 and the target object 10 occurs from a lower portion of the sensing terminal 100 based on FIG. 4(b), as the separation progresses, the light path of the light incident through the second slit 172 becomes short, which is the same as the separation from the upper portion.

However, in the case that the separation occurs from the lower portion, a width of the slit increases from the middle portion 172b of the second slit 172. As the width of the slit increases, the incident light amount also increases. The light amount incident on the illuminance sensor 142 while a separation occurs to the inner portion 171c, the light amount incident on the illuminance sensor 142 increases significantly in comparison with the separation in the upper portion. Lastly, according to the separation of the inner boundary 173 of the object coupling portion 170, the illumination value measured by the illuminance sensor 142 abruptly increases and then maintains.

As such, the slits of which widths are different is added to the object coupling portion 170 of the sensing terminal 100, illuminance change may be measured according to the separation direction of the sensing terminal 100. When the sensing terminal is attached, the sensing terminal is attached to the target object 10 in the point in which a separation may start naturally as the upper portion, and in the case that the change in illuminance value is recognized in the case that a separation occurs from the upper portion, this may be determined to be a natural detachment, and otherwise, determined to be a forced detachment.

In another embodiment, the detachable switch 141 and the illuminance sensor 142 are used together to determine whether the sensing terminal 100 is detached. When the pressing of the detachable switch 141 is released, whether the sensing terminal 100 is detached may be firstly identified. When detachment of the sensing terminal 100 is firstly identified, the sensing terminal 100 may check whether a sensing value of the illuminance sensor 142 exhibits a preset detachment threshold value or greater and determine whether the sensing terminal 100 is detached.

In another embodiment, a direction sensor such as a gyro sensor or a geomagnetic sensor may be used to determine whether the sensing terminal 100 is detached. In the case that a direction of the sensing terminal 100 detected by a direction sensor maintains a direction different from the direction in which the sensing terminal 100 is installed without regard to a change of the detachable switch 141 or the illuminance sensor 142, the sensing terminal 100 may determine that the sensing terminal 100 is detached from the target object 10. In order to specify the installed direction, the sensing terminal 100 may be installed only in the predetermined direction. Alternatively, the direction in which the sensing terminal 100 is installed may be identified through a direction sensor in an initial setup phase after the sensing terminal 100 is installed and stored in the memory 120, and accordingly, the installed direction may be specified.

The server 200 may monitor a position of the sensing terminal 100 and may monitor whether the target object 10 is deviated from a preset normal position. The server 200 may determine a position of the sensing terminal based on a position of a base station communication connected with the sensing terminal 100 or determine using a beacon communication. The sensing terminal 100 may transmit only information of the base station or the beacon to the server 200 to transmit a position of the sensing terminal 100, and accordingly, power consumption for transmitting the position information may be saved. In the case of using the beacon communication, the server 200 may receive an ID of the beacon received from a neighboring beacon by the sensing terminal 100 from the sensing terminal 100 and determine a position of the beacon identified using the beacon ID as the position of the sensing terminal 100. Hereinafter, the case that the server 200 monitors whether the target object 10 is deviated based on a position of a base station will be described.

The sensing terminal 100 may transmit information of a network base station to which a communication connection is configured to the server 200. The sensing terminal 100 may transmit a Cell ID of the base station as base station information in the case of using a wireless communication network.

The server 200 may identify a position of the base station to which the sensing terminal 100 is connected based on the Cell ID. Further, the server 200 may specify a position of the sensing terminal 100 by using a method such as the triangulation based on the position of the connected base station.

In the case that the sensing terminal 100 is present in a normal position, the server 200 may maintain a list of base stations which are connectable in the memory. In the following description, the list of base stations is called a safe cell in a short term. The safe cell may be configured in every sensing terminal 100. When the base station to which the sensing terminal 100 is communication connected is included in the safe cell, the server 200 may determine that the sensing terminal is located on a normal position.

When the base station to which the sensing terminal 100 is communication connected is not included in the safe cell, the server 200 may add the communication connected base station in the safe cell according to a predetermined criterion. In one embodiment, the server may add the currently communication connected base station in the safe cell according to the number of base stations included in the safe cell.

When the base station to which the sensing terminal 100 is communication connected is not included in the safe cell, and in the case that the number of base stations included in the safe cell is a preset number or smaller, the server 200 may add the communication connected base station in the safe cell. There is a case that coverage is overlapped for each base station, and in the case that the target object 10 moves in a coverage boundary between base stations and operates, handover may be frequently occurs among several base stations of a finite number for the sensing terminal 100 attached to the target object 10, which is not determined to be deviated from a normal position.

When the base station to which the sensing terminal 100 is communication connected is not included in the safe cell, and in the case that the number of base stations included in the safe cell is a preset number or greater, the server 200 may determine whether the sensing terminal 100 is deviated from a normal position and detached to exterior. For example, in the case that the target object 10 is stolen, the target object moves through an inconsiderable distance continuously. The server 200 adds the communication connected base station in the safe cell up to a predetermined number of base stations without regard to an actual distance from the base station even in the case that the sensing terminal 100 is communication connected with the base station not included in the safe cell. However, after a predetermined number or more of base stations is registered in the safe cell, in the case that the sensing terminal 100 performs a communication connection with a base station not included in the safe cell, the sensing terminal 100 may be determined to be deviated from a normal position.

In another embodiment, the server 200 may add the currently communication connected base station in the safe cell according to an operation time. In one embodiment, the server 200 may add all base stations that establish communication connections with the sensing terminal 100 in the safe cell within a predetermined time after the sensing terminal 100 starts operation. When the sensing terminal 100 establishes a communication connection with the base station which is not registered in the safe cell after a predetermine time is lapsed, the server 200 may determine the sensing terminal 100 is deviated from a normal position. In the case that a predetermine time is lapsed, the server 200 may delete the information of the base station registered in the safe cell and update the safe cell by reregistering the communication connected base station connected during a predetermined time in the safe cell.

In another embodiment, the server 200 may maintain a predetermined number of base stations in the safe cell as described above and delete the base station connected after a predetermined time after registered in the safe cell. For this, the server 200 may register registration time information together when adding the base station in the safe cell. In this embodiment, when a communication connected base station is not included in the safe cell, and in the case that the number of base stations added in the safe cell is a predetermined number or smaller, the server 200 may add the communication connected base station in the safe cell. When a communication connected base station is not included in the safe cell, and in the case that the number of base stations added in the safe cell is a predetermined number, the server 200 may determine that the sensing terminal 100 is deviated from a normal position.

In one embodiment, in the case that the sensing terminal 100 establishes a communication connection with a base station not included in the safe cell, the server 200 may determine a degree of risk by using positions of currently connected base stations and positions of the base stations registered in the safe cell or determine a degree of risk by using GPS or a position of the sensing terminal 100 from the currently connected base station measured through triangulation or positions of base stations registered in the safe cell.

In the case that a position of the base station to which the sensing terminal 100 is currently connected is within a preset safe distance from the base stations registered in the safe cell, the server 200 may determine that the sensing terminal 100 is deviated from a normal position but not in a risky state. On the other hand, in the case that a position of the base station to which the sensing terminal 100 is currently connected is deviated from a preset safe distance from a reference position which is determined from positions of the base stations registered in the safe cell, the server 200 may determine that the sensing terminal 100 is in a risky state.

The server 200 may identify a position of base station which is currently connected based on the position information of the base station identified by the Cell ID. The server 200 may set a position of base station located in the nearest distance from a position of the currently connected base station among the base stations included in the safe cell as a reference position, set a position of base station located in the farthest distance as a reference position, or set a middle position between two base stations as a reference position. In another example, the server 200 may set a middle position of the base stations included in the safe cell as a reference position. For example, the server 200 may set a coordinate obtained by calculating an arithmetic mean of longitudes and altitudes of the base stations as a reference position.

The method for monitoring a mobile asset according to an embodiment described above may be implemented in a program command form executable by various computer means and recorded in a computer readable medium. The computer readable medium may include one or combination of a program command, a data file, a data structure, and the like. The program command recorded in the medium may be specially designed or configured according to the embodiment or usable by being published to a skilled person in computer software. An example of the computer readable medium includes a hardware device specially configured to store and execute the program command such as magnetic media such as a hard disk, a floppy disk, and a magnetic disk, magneto-optical media such as a floptical disk, ROM, RAN, and flash memory. The example of the program command includes a high level language executable by a computer using an interpreter as well as a machine language code made by a compiler.

Each of the drawings referred in the description for the embodiment is just an example shown for the convenience of description, and items, contents, and images of the information shown in each drawing may be modified and shown in various shapes.

The present disclosure has been described with reference to the embodiment shown in the drawing, but this is just exemplary, and it is understood that various modifications and the equivalent embodiment are available from an ordinary skilled person in the art. Therefore, the technical protection scope of the present disclosure should be determined by the inventive concept of the attached claims.

What is claimed is:

1. A sensing terminal, comprising:
a housing;
a coupling unit for coupling a target object to the housing;
a sensor unit for generating sensing data for the target object;
a processor for generating, based on the sensing data, transmission unit data to be transmitted to a server; and
a communication unit for transmitting the transmission unit data to the server,
wherein the sensor unit includes a first sensor and a second sensor,
wherein the processor applies a measurement start signal to the second sensor when receiving a detachment signal, from the first sensor, representing that the housing is detached from the target object, and
wherein the processor determines whether the housing is detached from the target object based on a measurement value of the measurement start signal of the second sensor.

2. The sensing terminal of claim 1, wherein the processor generates state data of the target object having a data size smaller than a data size of the sensing data, and
wherein the transmission unit data includes the state data of the target object.

3. The sensing terminal of claim 1, wherein the second sensor is an illuminance sensor formed on one side of the housing,
wherein the processor determines whether the sensing terminal is detached from the target object according to a change in an illuminance value measured using the illuminance sensor, and
wherein the processor determines a detachment type in which the sensing terminal is detached from the target object according to the change in the illuminance value measured using the illuminance sensor.

4. The sensing terminal of claim 3, wherein the processor compares the illuminance value measured from the illuminance sensor according to an elapse of time with a threshold illuminance value specified according to the elapse of time when the illuminance value is measured after the sensing terminal is attached to the target object to determine the detachment type, and
wherein the processor determines a forced detachment when the measured illuminance value is greater than the threshold illuminance value specified according to the elapse of time.

5. The sensing terminal of claim 3, wherein the first sensor is a detachable switch formed on another side of the housing,
wherein the processor applies an illuminance measurement start signal to the illuminance sensor when receiving the detachment signal from the detachable switch, wherein the processor determines whether the sensing terminal is detached from the target object according to the change in the illuminance value measured from the illuminance sensor, and wherein the illuminance sensor does not sense the measured illuminance value before receiving the illuminance measurement start signal from the processor.

6. The sensing terminal of claim 3, wherein, when the measured illuminance value is smaller than a preset threshold value, the illuminance sensor does not store the measured illuminance value in a memory, and when the measured illuminance value is greater than the preset threshold value, wherein the illuminance sensor stores the measured illuminance value in the memory and applies a first detachment signal to the processor.

7. The sensing terminal of claim 3, wherein the coupling unit further includes a slit, and wherein the illuminance sensor senses the measured illuminance value by light incident through the slit even when the sensing terminal is attached to the target object.

8. The sensing terminal of claim 1, wherein the second sensor does not perform the measurement value before receiving the measurement start signal from the processor.

9. A method for monitoring a target object using a sensing terminal, comprising:

generating sensing data for the target object that is coupled to a housing of the sensing terminal;

generating transmission unit data to be transmitted to a server based on the sensing data; and transmitting the transmission unit data to the server, wherein the sensor unit includes a first sensor and a second sensor, wherein generating the sensing data for the target object includes:

applying a measurement start signal to the second sensor when a detachment signal representing that the housing is detached from the target object is generated from the first sensor; and determining whether the housing is detached from the target object based on a measurement value of the measurement start signal of the second sensor.

10. A non-transitory computer readable recording medium, comprising:

a computer program stored in the non-transitory computer readable recording medium to perform the method for monitoring the target object of claim 9.

* * * * *